United States Patent
Tanaka (10) Patent No.: US 8,588,610 B2
(45) Date of Patent: Nov. 19, 2013

(54) SPAN LOSS MONITORING SYSTEM, SUPERVISORY SIGNAL SENDING APPARATUS AND SUPERVISORY SIGNAL RECEIVING APPARATUS

(75) Inventor: Hiroaki Tanaka, Minato-ku (JP)

(73) Assignee: NEC Corporation, Tokyo (JP)

( * ) Notice: Subject to any disclaimer, the term of this patent is extended or adjusted under 35 U.S.C. 154(b) by 100 days.

(21) Appl. No.: 13/364,883

(22) Filed: Feb. 2, 2012

(65) Prior Publication Data

US 2012/0207469 A1 Aug. 16, 2012

(30) Foreign Application Priority Data

Feb. 16, 2011 (JP) ................. 2011-030639

(51) Int. Cl.
*H04B 17/00* (2006.01)

(52) U.S. Cl.
USPC ............. 398/30; 398/34; 398/33; 398/25

(58) Field of Classification Search
USPC .................. 398/30, 33, 9, 25, 34
See application file for complete search history.

(56) References Cited

U.S. PATENT DOCUMENTS

| | | | | |
|---|---|---|---|---|
| 4,673,291 A * | 6/1987 | Heckmann | ........... | 356/73.1 |
| 5,077,729 A * | 12/1991 | Wong | ........... | 398/31 |
| 5,212,534 A * | 5/1993 | Bianchi et al. | ........... | 356/4.01 |
| 6,701,086 B1 * | 3/2004 | Heiles | ........... | 398/30 |
| 7,463,829 B2 * | 12/2008 | Uda et al. | ........... | 398/97 |
| 8,406,620 B2 * | 3/2013 | Khermosh et al. | ........... | 398/16 |
| 2003/0053165 A1 * | 3/2003 | Nagayama et al. | ........... | 359/110 |
| 2003/0170021 A1 * | 9/2003 | Larsson | ........... | 398/25 |
| 2004/0146306 A1 * | 7/2004 | Muzicant et al. | ........... | 398/177 |
| 2004/0175171 A1 * | 9/2004 | Kokkinos | ........... | 398/14 |
| 2004/0208507 A1 * | 10/2004 | Saunders et al. | ........... | 398/19 |
| 2006/0198634 A1 * | 9/2006 | Ofalt et al. | ........... | 398/16 |
| 2009/0116847 A1 * | 5/2009 | Duan et al. | ........... | 398/137 |

FOREIGN PATENT DOCUMENTS

JP 2007-104103 A 4/2007

* cited by examiner

*Primary Examiner* — Ken Vanderpuye
*Assistant Examiner* — Dibson Sanchez
(74) *Attorney, Agent, or Firm* — Sughrue Mion, PLLC (57) ABSTRACT

A span loss monitoring system includes a supervisory signal sending apparatus with a output level monitoring section, a time stamp generation section, and a supervisory signal generation section that generates a supervisory signal including a pair of the output level measurement hour and the output level. The span loss monitoring system also includes a supervisory signal receiving apparatus with an input level monitoring section, a supervisory signal termination section and a span loss calculation section.

11 Claims, 8 Drawing Sheets

| TIME STAMP $t$ [YEAR:MONTH:DAY:TIME:MINUTE:SECOND] | OUTPUTLEVEL $\alpha$ [dBm] | INPUTLEVEL $\beta$ [dBm] | SPANLOSS $\alpha - \beta$ [dB] |
|---|---|---|---|
| 2010:12:01:12:00:00 | 5.0 | -15.0 | 20.0 |
| 2010:12:01:12:01:00 | 5.0 | -15.0 | 20.0 |
| 2010:12:01:12:02:00 | 5.0 | -15.0 | 20.0 |
| 2010:12:01:12:03:00 | 5.0 | -17.0 | 22.0 |
| 2010:12:01:12:04:00 | 5.0 | -20.0 | 25.0 |
| 2010:12:01:12:05:00 | 5.0 | -16.0 | 21.0 |
| 2010:12:01:12:06:00 | 5.0 | -15.0 | 20.0 |
| 2010:12:01:12:07:00 | 5.0 | -15.0 | 20.0 |
| 2010:12:01:12:08:00 | 5.0 | -15.0 | 20.0 |

SPAN LOSS MONITORING SYSTEM, SUPERVISORY SIGNAL SENDING APPARATUS AND SUPERVISORY SIGNAL RECEIVING APPARATUS

This application is based upon and claims the benefit of priority from Japanese patent application No. 2011-030639, filed on Feb. 16, 2011, the disclosure of which is incorporated herein in its entirety by reference.

BACKGROUND OF THE INVENTION

1. Field of the Invention

The present invention relates to a system for monitoring the span loss of a transmission line in a WDM (Wavelength Division Multiplex) transmission apparatus.

2. Description of the Related Art

In a WDM system, it is necessary to adjust the input level of a received-light amplifier to be within an operation range or to detect level fluctuation due to a transmission line, which influences a main signal, at the time of initial construction or at the time of switching the transmission line after start of operation, and, therefore, it is important to measure and monitor the span loss of a relevant transmission line.

Since the input/output level always fluctuates within a certain range of width, it is not possible to measure correct span loss unless maintainers of both the upstream-station apparatus and downstream-station apparatus measure and compare the level at the same timing. Therefore, in order to measure span loss, a procedure is generally taken in which the maintainers enter the upstream station and the downstream station, confirm the output level of the upstream-station apparatus and the input level of the downstream-station apparatus, respectively, with a level monitoring function implemented for measuring instruments or the apparatuses and manually compare the levels. When a main signal is influenced by level fluctuation of the transmission line being used, the upstream-station apparatus and the downstream-station apparatus read out level monitor values, respectively, and manually compare the values to confirm the influence.

There is proposed an invention for controlling the output level of an optical amplifier on the receiving side of a WDM system (for example, see JP2007-104103A). The WDM system of JP2007-104103A is provided with a sending-side optical transmission apparatus and a receiving-side optical transmission apparatus, and it operates as shown below. The sending-side optical transmission apparatus sends the-number-of-wavelengths information as regards the signal light to the receiving-side optical transmission apparatus using an OSC (Optical Supervisory Channel). The receiving-side optical transmission apparatus detects a transmission line abnormality or an increase/decrease in the number of wavelengths multiplexed on a WDM light using the received OSC light and adjusts the amount of attenuation of an optical signal at the time of receiving the optical signal in accordance with a result of the detection.

As described above, confirmation of span loss requires much time and effort from personnel because comparison between an upstream station and a downstream station is manually performed. Therefore, there is a demand for simplification thereof, and accurate monitoring is a problem to be solved.

In the WDM system of JP2007-104103A, the timing for measuring the level of an optical signal is not considered. A configuration for measuring the levels of optical signals at the upstream station and the downstream station at the same hour is not disclosed. Therefore, the WDM system of JP2007-104103A cannot measure the levels of the optical signals at the upstream station and the downstream station at the same hour and, consequently, cannot accurately measure span loss.

SUMMARY OF THE INVENTION

Thus, the object of the present invention is to make it possible to accurately measure span loss without requiring much time and effort from personnel.

The span loss monitoring system of the present invention is provided with: a supervisory signal sending apparatus including: a multiplexing section into which a wavelength-multiplexed signal and a supervisory signal are inputted and that multiplexes the inputted wavelength-multiplexed signal and supervisory signal; an output level monitoring section that measures and outputs an output level of a multiplexed light from the multiplexing section and outputs the multiplexed light to a transmission line; a time stamp generation section that detects the hour of the measurement by the output level monitoring section and associates the output level measurement hour and the output level with each other; and a supervisory signal generation section that generates the supervisory signal including a pair of the output level measurement hour and the output level associated with each other by the time stamp generation section; and a supervisory signal receiving apparatus including: an input level monitoring section into which the multiplexed light is inputted from the transmission line and that measures an input level of the multiplexed light; a supervisory signal termination section that receives the supervisory signal included in the multiplexed light; and a span loss calculation section that detects the hour of the measurement of the input level by the input level monitoring section, stores the input level measurement hour and the input level associating the input level measurement hour and the input level with each other, extracts the output level measurement hour and the output level included in the supervisory signal received by the supervisory signal termination section, and calculates a difference between the input level and the output level at the same hour.

The supervisory signal sending apparatus of the present invention is provided with: a multiplexing section into which a wavelength-multiplexed signal and a supervisory signal are inputted and that multiplexes the inputted wavelength-multiplexed signal and supervisory signal; an output level monitoring section that measures and outputs an output level of a multiplexed light from the multiplexing section and outputs the multiplexed light to a transmission line; a time stamp generation section that detects the hour of the measurement by the output level monitoring section and associates the output level measurement hour and the output level with each other; and a supervisory signal generation section that generates the supervisory signal including a pair of the output level measurement hour and the output level associated with each other by the time stamp generation section.

The supervisory signal receiving apparatus of the present invention is provided with: an input level monitoring section into which a multiplexed light of a wavelength-multiplexed signal and a supervisory signal is inputted from a transmission line and that measures an input level of the multiplexed light; a supervisory signal termination section that receives the supervisory signal included in the multiplexed light; and a span loss calculation section that detects the hour of the measurement of the input level by the input level monitoring section, stores the input level measurement hour and the input level associating the input level measurement hour and the input level with each other, extracts the output level measurement hour and the output level included in the supervisory signal received by the supervisory signal termination section, and calculates a difference between the input level and the output level at the same hour.

The span loss monitoring method of the present invention includes: a monitoring procedure of a supervisory signal sending apparatus for measuring an output level of a multiplexed light in which a wavelength-multiplexed signal and a supervisory signal are multiplexed, detecting the hour of the measurement of the output level and outputting the multiplexed light to a transmission line and a supervisory signal receiving apparatus for measuring an input level of the multiplexed light inputted from the transmission line and detecting the hour of the measurement of the input level; and a supervisory signal generation and span loss calculation procedure of the supervisory signal sending apparatus for generating a supervisory signal including a pair of the output level measurement hour and the output level and generating a multiplexed light by multiplexing the supervisory signal and a wavelength-multiplexed signal, and the supervisory signal receiving apparatus for extracting the output level measurement hour and the output level included in the supervisory signal of the multiplexed light outputted to the transmission line by the monitoring procedure and calculating a difference between the input level and the output level at the same hour.

The supervisory signal sending method of the present invention includes: an output level monitoring procedure of measuring and outputting an output level of a multiplexed light in which a wavelength-multiplexed signal and a supervisory signal are multiplexed and outputting the multiplexed light to a transmission line; a time stamp generation procedure of detecting the hour of the measurement by the output level monitoring procedure and associating the output level measurement hour and the output level with each other; a supervisory signal generation procedure of generating the supervisory signal including a pair of the output level measurement hour and the output level associated with each other by the time stamp generation procedure; and a multiplexing procedure of generating a multiplexed light in which a wavelength-multiplexed signal and the supervisory signal generated by the supervisory signal generation procedure are multiplexed.

The computer readable recording medium in which a supervisory signal sending program is recorded, the supervisory signal sending program causing a computer to execute: an output level monitoring procedure of an output level monitoring section for measuring and outputting an output level of a multiplexed light in which a wavelength-multiplexed signal and a supervisory signal are multiplexed and outputting the multiplexed light to a transmission line; a time stamp generation procedure of a time stamp generation section for detecting the hour of the measurement by the output level monitoring procedure and associating the output level measurement hour and the output level with each other; a supervisory signal generation procedure of a supervisory signal generation section for generating the supervisory signal including a pair of the output level measurement hour and the output level associated with each other by the time stamp generation procedure; and a multiplexing procedure of a multiplexing section for generating a multiplexed light in which a wavelength-multiplexed signal and the supervisory signal generated by the supervisory signal generation procedure are multiplexed.

The supervisory signal receiving method of the present invention includes: an input level monitoring procedure of a multiplexed light of a wavelength-multiplexed signal and a supervisory signal being inputted from a transmission line, measuring an input level of the multiplexed light and detecting the hour of the measurement of the input level; a supervisory signal termination procedure of receiving the supervisory signal included in the multiplexed light; and a span loss calculation procedure of storing the input level measurement hour and the input level in the input level monitoring procedure associating the input level measurement hour and the input level with each other, extracting a pair of the output level measurement hour and the output level included in the supervisory signal received by the supervisory signal termination procedure, and calculating a difference between the input level and the output level at the same hour.

The computer readable recording medium in which a supervisory signal receiving program is recorded, the supervisory signal receiving program causing a computer to execute: an input level monitoring procedure of an input level monitoring section for measuring an input level of a multiplexed light of a wavelength-multiplexed signal and a supervisory signal inputted from a transmission line and detecting the hour of the measurement of the input level; a supervisory signal termination procedure of a supervisory signal termination section for receiving the supervisory signal included in the multiplexed light; and a span loss calculation procedure of a span loss calculation section for storing the input level measurement hour and the input level in the input level monitoring procedure associating the input level measurement hour and the input level with each other, extracting a pair of the output level measurement hour and the output level included in the supervisory signal received by the supervisory signal termination procedure, and calculating a difference between the input level and the output level at the same hour.

According to the present invention, it is possible to accurately measure span loss without requiring much time and effort from personnel.

The above and other objects, features, and advantages of the present invention will become apparent from the following description with reference to the accompanying drawings which illustrate examples of the present invention.

DESCRIPTION OF THE PREFERRED EMBODIMENTS

Exemplary embodiments will be described with reference to accompanying drawings. The exemplary embodiments described below are examples of practicing the present invention, and the present invention is not limited to the exemplary embodiments below. In this specification and the drawings, components with the same reference numerals are assumed to refer to the same thing.

First Exemplary Embodiment

Figure 1:
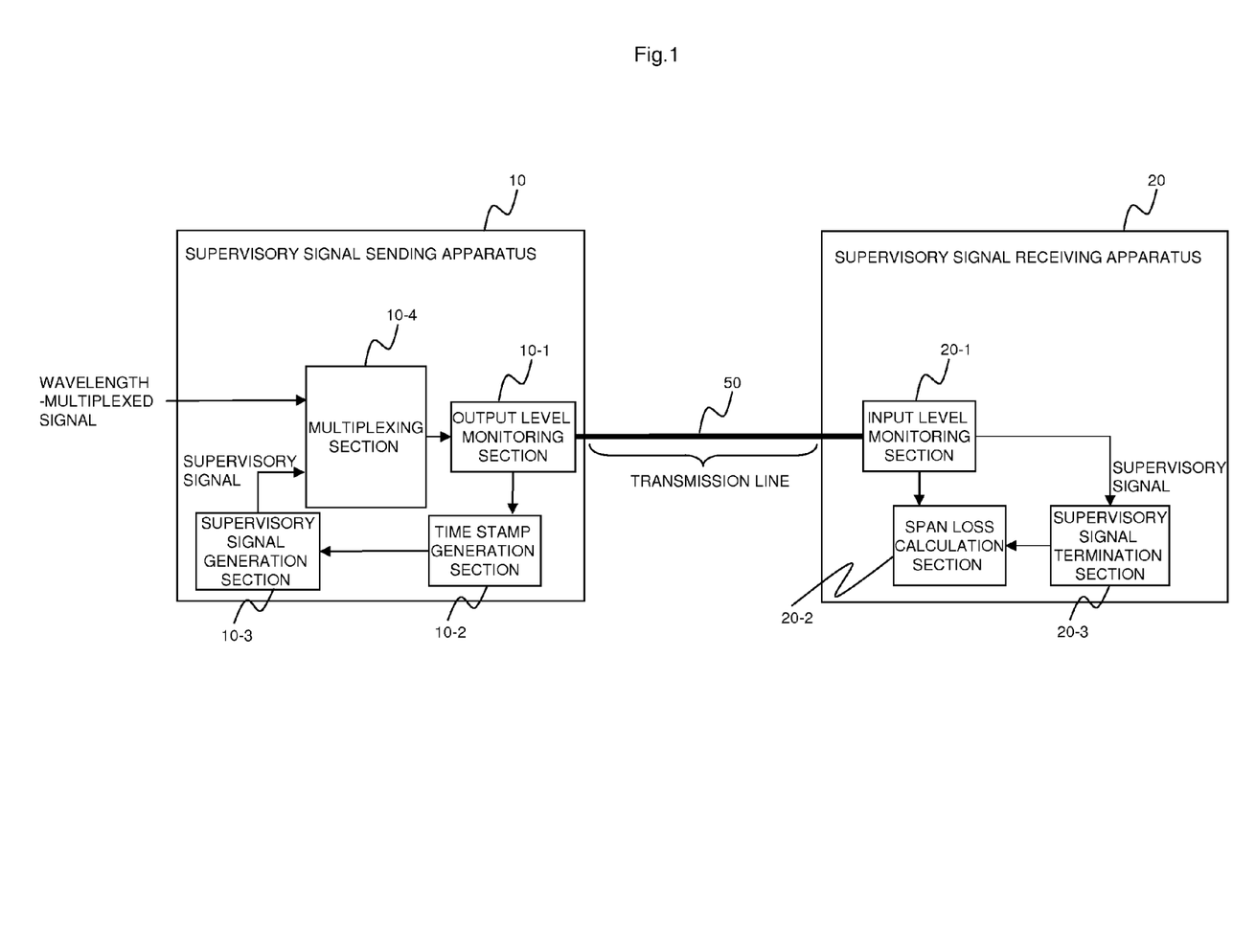
FIG. 1 is a diagram showing an example of a span loss monitoring system according to a first exemplary embodiment.

FIG. 1 shows an example of a span loss monitoring system according to this exemplary embodiment. The span loss monitoring system according to this exemplary embodiment is provided with supervisory signal sending apparatus 10 and supervisory signal receiving apparatus 20. Supervisory signal sending apparatus 10 is provided with output level monitoring section 10-1, time stamp generation section 10-2, supervisory signal generation section 10-3 and multiplexing section 10-4. Supervisory signal receiving apparatus 20 is provided with input level monitoring section 20-1, supervisory signal termination section 20-3, span loss calculation section 20-2.

Figure 2:
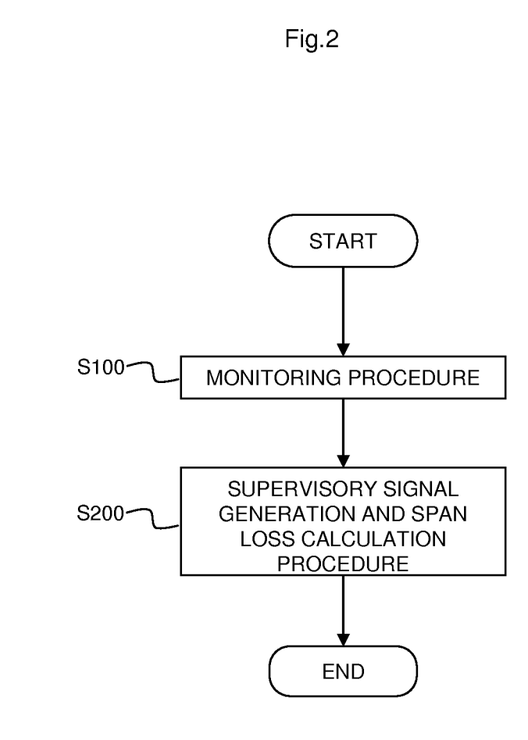
FIG. 2 is a diagram showing an example of a span loss monitoring method according to the first exemplary embodiment.

FIG. 2 shows an example of a span loss monitoring method according to this exemplary embodiment. The span loss monitoring method according to this exemplary embodiment includes monitoring procedure S100 and supervisory signal generation and span loss calculation procedure S200.

Figure 3:
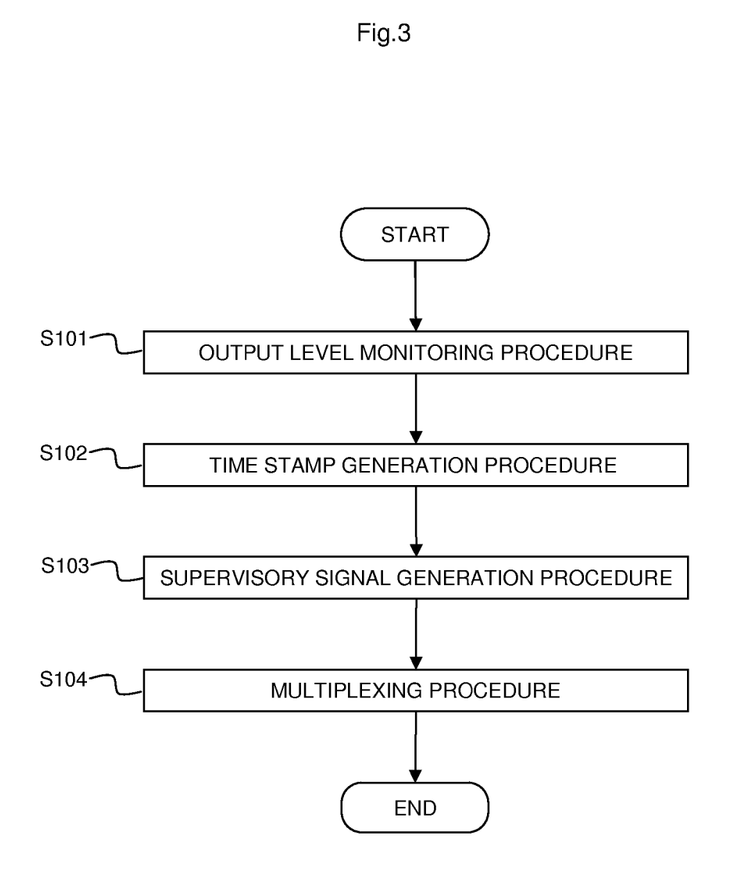
FIG. 3 is a diagram showing an example of a supervisory signal sending method according to the first exemplary embodiment.

FIG. 3 shows an example of a supervisory signal sending method according to this exemplary embodiment. The supervisory signal sending method according to this exemplary embodiment includes output level monitoring procedure S101, time stamp generation procedure S102, supervisory signal generation procedure S103 and multiplexing procedure S104. The supervisory signal sending program according to this exemplary embodiment is a program for causing a computer to execute output level monitoring procedure S101, time stamp generation procedure S102, supervisory signal generation procedure S103 and multiplexing procedure S104.

Figure 4:
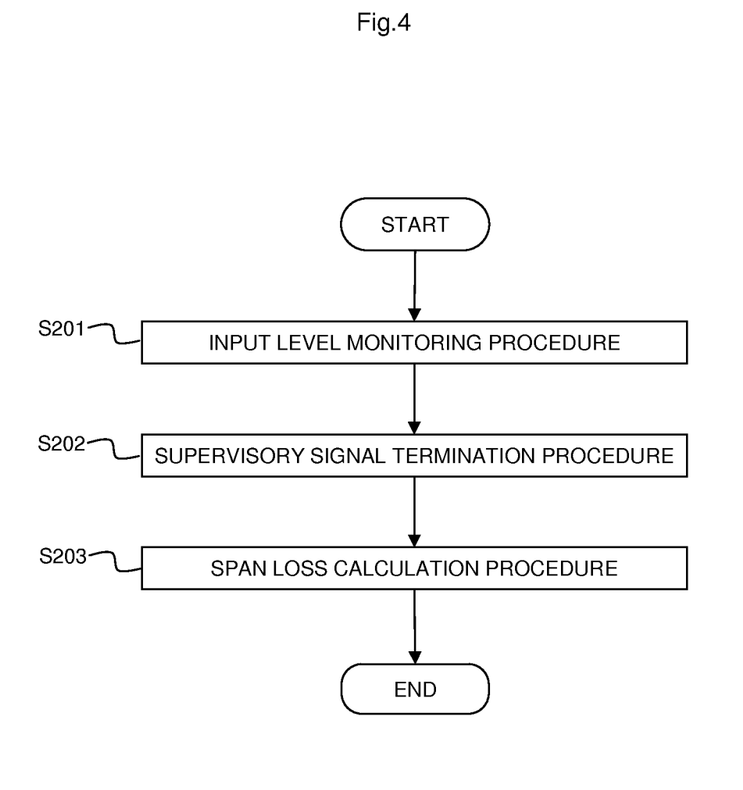
FIG. 4 is a diagram showing an example of a supervisory signal receiving method according to the first exemplary embodiment.

FIG. 4 shows an example of a supervisory signal receiving method according to this exemplary embodiment. The supervisory signal receiving method according to this exemplary embodiment includes input level monitoring procedure S201, supervisory signal termination procedure S202 and span loss calculation procedure S203. The supervisory signal receiving program according to this exemplary embodiment is a program for causing a computer to execute input level monitoring procedure S201, supervisory signal termination procedure S202 and span loss calculation procedure S203.

In monitoring procedure S100 shown in FIG. 2, supervisory signal sending apparatus 10 measures the output level of a multiplexed light in which a wavelength-multiplexed signal and a supervisory signal are multiplexed, detects the hour of the measurement of the output level and outputs the multiplexed light to a transmission line. Furthermore, supervisory signal receiving apparatus 20 measures the input level of the multiplexed light inputted from transmission line 50 and detects the hour of the measurement of the input level. Specifically, output level monitoring procedure S101 shown in FIG. 3 and input level monitoring procedure S201 shown in FIG. 4 are executed.

In output level monitoring procedure S101, output level monitoring section 10-1 measures and outputs the output level of the multiplexed light from multiplexing section 10-4 and outputs the multiplexed light to transmission line 50. Thereby, supervisory signal sending apparatus 10 can send the wavelength-multiplexed signal and the supervisory signal to supervisory signal receiving apparatus 20.

In input level monitoring procedure S201, the multiplexed light of the wavelength-multiplexed signal and the supervisory signal is inputted from transmission line 50; the input level of the multiplexed light is measured; and the hour of the measurement of the input level is detected. For example, input level monitoring section 20-1 measures the input level of the multiplexed light. Then, span loss calculation section 20-2 detects the hour of the measurement of the input level by input level monitoring section 20-1 and stores the input level measurement hour and the input level associating them with each other.

Here, output level monitoring procedure S101 and input level monitoring procedure S201 are performed at the same time. For example, output level monitoring section 10-1 and input level monitoring section 20-1 start measurement at the same timing at the same hour. Then, output level monitoring section 10-1 measures the output level in a predetermined cycle, and input level monitoring section 20-1 measures the input level in a predetermined cycle. Thereby, the level of a signal sent by supervisory signal sending apparatus 10 and the level of a signal received by supervisory signal receiving apparatus 20 can be measured at the same time.

It is also possible for output level monitoring section 10-1 to measure the output level at a predetermined hour and for input level monitoring section 20-1 to measure the input level at the predetermined hour. Thereby, the level of a signal sent by supervisory signal sending apparatus 10 and the level of a signal received by supervisory signal receiving apparatus 20 can be measured at the same time.

In supervisory signal generation and span loss calculation procedure S200 shown in FIG. 2, supervisory signal sending apparatus 10 generates a supervisory signal including a pair of output level measurement hour and an output level and generates a multiplexed light by multiplexing the supervisory signal and a wavelength-multiplexed signal. Furthermore, supervisory signal receiving apparatus 20 extracts the output level measurement hour and the output level included in the supervisory signal and calculates the difference between the input level and the output level at the same hour. Specifically, time stamp generation procedure S102, supervisory signal generation procedure S103 and multiplexing procedure S104 shown in FIG. 3 are sequentially executed, and supervisory signal termination procedure S202 and span loss calculation procedure S203 shown in FIG. 4 are sequentially executed.

In time stamp generation procedure S102, time stamp generation section 10-2 detects the hour of the measurement by output level monitoring section 10-1 and associates the output level measurement hour and the output level with each other.

In supervisory signal generation procedure S103, supervisory signal generation section 10-3 generates the supervisory signal including the pair of the output level measurement hour and the output level which have been associated with each other by time stamp generation section 10-2.

In multiplexing procedure S104, multiplexing section 10-4 multiplexes an inputted wavelength-multiplexed signal and the supervisory signal.

In supervisory signal termination procedure S202, supervisory signal termination section 20-3 receives the supervisory signal included in the multiplexed light.

In span loss calculation procedure S203, span loss calculation section 20-2 extracts the output level measurement hour and the output level included in the supervisory signal received by supervisory signal termination section 20-3. On the other hand, span loss calculation section 20-2 reads out input the level measurement hour and the input level which have been stored. Then, span loss calculation section 20-2 calculates the difference between the input level and the output level at the same hour.

Second Exemplary Embodiment

Figure 5:
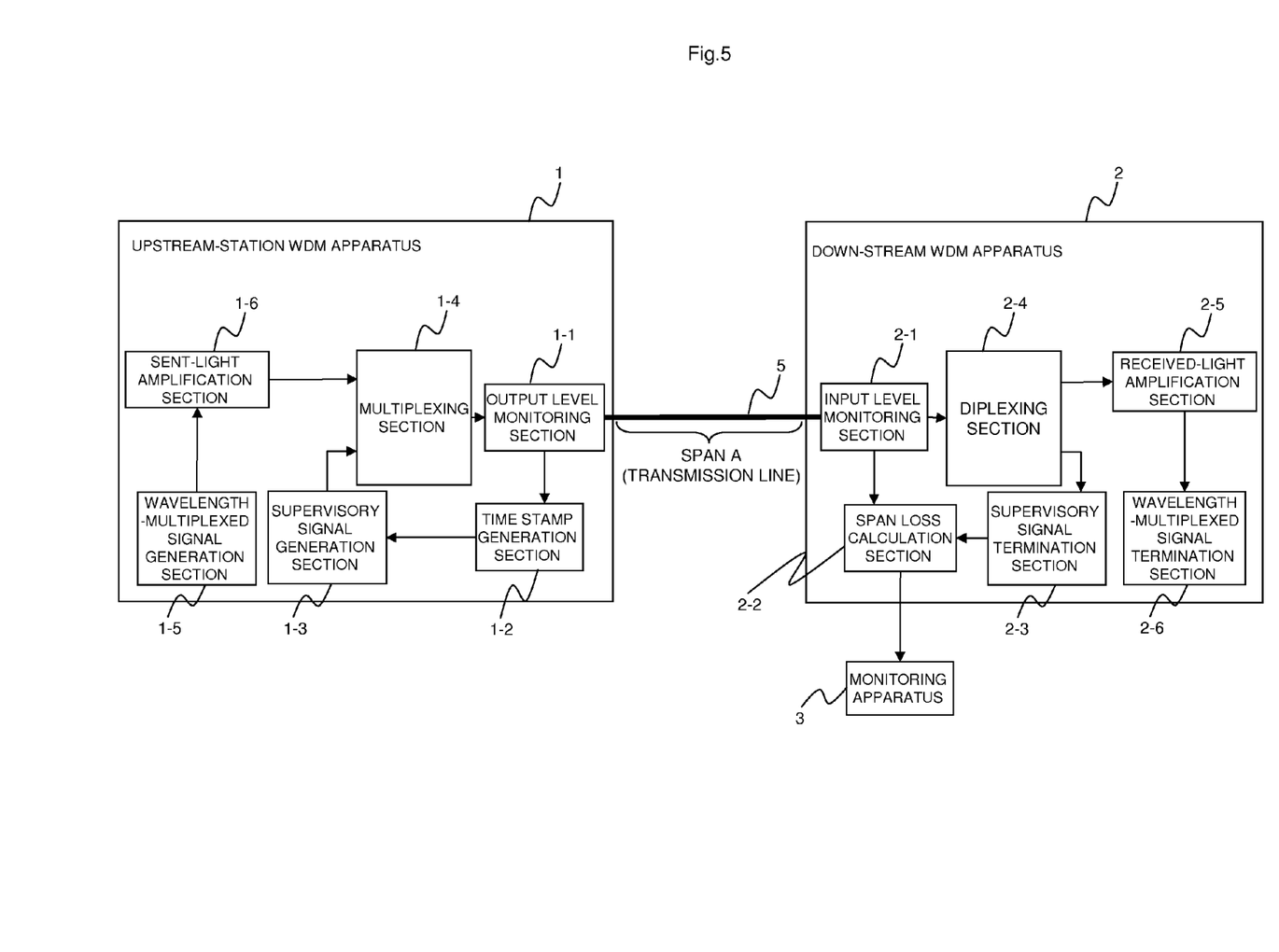
FIG. 5 is a diagram showing a configuration of a span loss monitoring system according to a second exemplary embodiment.

FIG. 5 shows a configuration of a span loss monitoring system according to this exemplary embodiment. In the span loss monitoring system according to this exemplary embodiment, upstream-station WDM apparatus 1 and downstream-station WDM apparatus 2 are connected via a transmission line (span A). At the downstream station, downstream-station WDM apparatus 2 is connected to monitoring apparatus 3. In this exemplary embodiment, upstream-station WDM apparatus 1 functions as a supervisory signal sending apparatus, and downstream-station WDM apparatus 2 functions as a supervisory signal receiving apparatus.

Upstream-station WDM apparatus 1 (sending side) is provided with output level monitoring section 1-1, time stamp generation section 1-2, supervisory signal generation section 1-3, multiplexing section 1-4, wavelength-multiplexed signal generation section 1-5 and sent-light amplification section 1-6. Downstream-station WDM apparatus 2 (receiving side) is provided with input level monitoring section 2-1, span loss calculation section 2-2, supervisory signal termination section 2-3, diplexing section 2-4, received-light amplification section 2-5 and wavelength-multiplexed signal termination section 2-6.

The operation of upstream-station WDM apparatus 1 is as follows. An output from wavelength-multiplexed signal generation section 1-5 which generates a wavelength-multiplexed signal (main signal) is connected to an input to sent-light amplification section 1-6. A signal output which is adjusted to an appropriate output level by sent-light amplification section 1-6 is connected to an input to multiplexing section 1-4. A signal output generated by multiplexing a supervisory signal from supervisory signal generation section 1-3 and the wavelength-multiplexed signal from sent-light amplification section 1-6 at multiplexing section 1-4 is connected to an input to output level monitoring section 1-1. A signal output from output level monitoring section 1-1 is connected to an input to downstream-station WDM apparatus 2 via transmission line 5. An output level value output from output level monitoring section 1-1 is connected to an input to time stamp generation section 1-2. A signal output from time stamp generation section 1-2 is connected to an input to supervisory signal generation section 1-3.

The operation of downstream-station WDM apparatus 2 is as follows. A signal from upstream-station WDM apparatus 1 is connected to input level monitoring section 2-1 via transmission line 5. A signal output from input level monitoring section 2-1 is connected to an input to diplexing section 2-4. An input level value output from input level monitoring section 2-1 is connected to an input to span loss calculation section 2-2. Diplexing section 2-4 separates a wavelength-multiplexed signal and a supervisory signal, and a wavelength-multiplexed signal output and a supervisory signal output are connected to an input to received-light amplification section 2-5 and to an input to supervisory signal termination section 2-3, respectively. A signal output from received-light amplification section 2-5 is connected to an input to wavelength-multiplexed signal termination section 2-6. A signal output from supervisory signal termination section 2-3 is connected to an input to span loss calculation section 2-2.

(1) Operation of Upstream Station (WDM Apparatus 1)

Wavelength-multiplexed signal generation section 1-5 multiplexes main signal data with different wavelengths and outputs it to sent-light amplification section 1-6 as a wavelength-multiplexed signal. Sent-light amplification section 1-6 amplifies the output level to an appropriate level so that the wavelength-multiplexed signal can be transmitted to downstream-station WDM apparatus 2. On the other hand, supervisory signal generation section 1-3 generates a supervisory signal. Control parameters required for controlling downstream-station WDM apparatus 2 are inserted into the supervisory signal. Multiplexing section 1-4 multiplexes the wavelength-multiplexed signal (main signal) and the supervisory signal. Output level monitoring section 1-1 causes the wavelength-multiplexed signal (main signal) and the supervisory signal to pass through and outputs them to a transmission line and monitors the output level of WDM apparatus 1.

Time stamp generation section 1-2 adds information about the date and time of the monitoring (time stamp information) to the value of the output level monitored by output level monitoring section 1-1 (monitoring period t [sec]). Time stamp generation section 1-2 updates the output level value and the date and time information (time stamp information) for each monitoring period oft [sec]. Supervisory signal generation section 1-3 superposes the time-stamp-information-attached output level value, which is an output from time stamp generation section 1-2, onto the supervisory signal. Thereby, upstream-station WDM apparatus 1 can send the output level value and the information about the date and time of the monitoring to downstream-station WDM apparatus 2 together with other control parameters.

(2) Operation of Downstream Station (WDM Apparatus 2)

The wavelength-multiplexed signal and the supervisory signal transferred from upstream-station WDM apparatus 1 are inputted into input level monitoring section 2-1 in downstream-station WDM apparatus 2. Input level monitoring section 2-1 causes the wavelength-multiplexed signal (main signal) and the supervisory signal to pass through and outputs them to diplexing section 2-4. Input level monitoring section 2-1 also monitors the input level of WDM apparatus 2 and outputs the result to span loss calculation section 2-2. Diplexing section 2-4 separates the wavelength-multiplexed signal and the supervisory signal. Received-light amplification section 2-5 amplifies the wavelength-multiplexed signal (main signal) inputted from diplexing section 2-4 to an appropriate level and outputs it to wavelength-multiplexed signal termination section 2-6. Wavelength-multiplexed signal termination section 2-6 separates the wavelength-multiplexed signal according to wavelengths and terminates main signal data of the wavelengths.

On the other hand, the supervisory signal separated by diplexing section 2-4 is inputted into supervisory signal termination section 2-3. Supervisory signal termination section 2-3 separates a time-stamp-information-attached output level value of the upstream station included in the supervisory signal from other control parameters and outputs the time-stamp-information-attached output level value to span loss calculation section 2-2.

Figure 6:
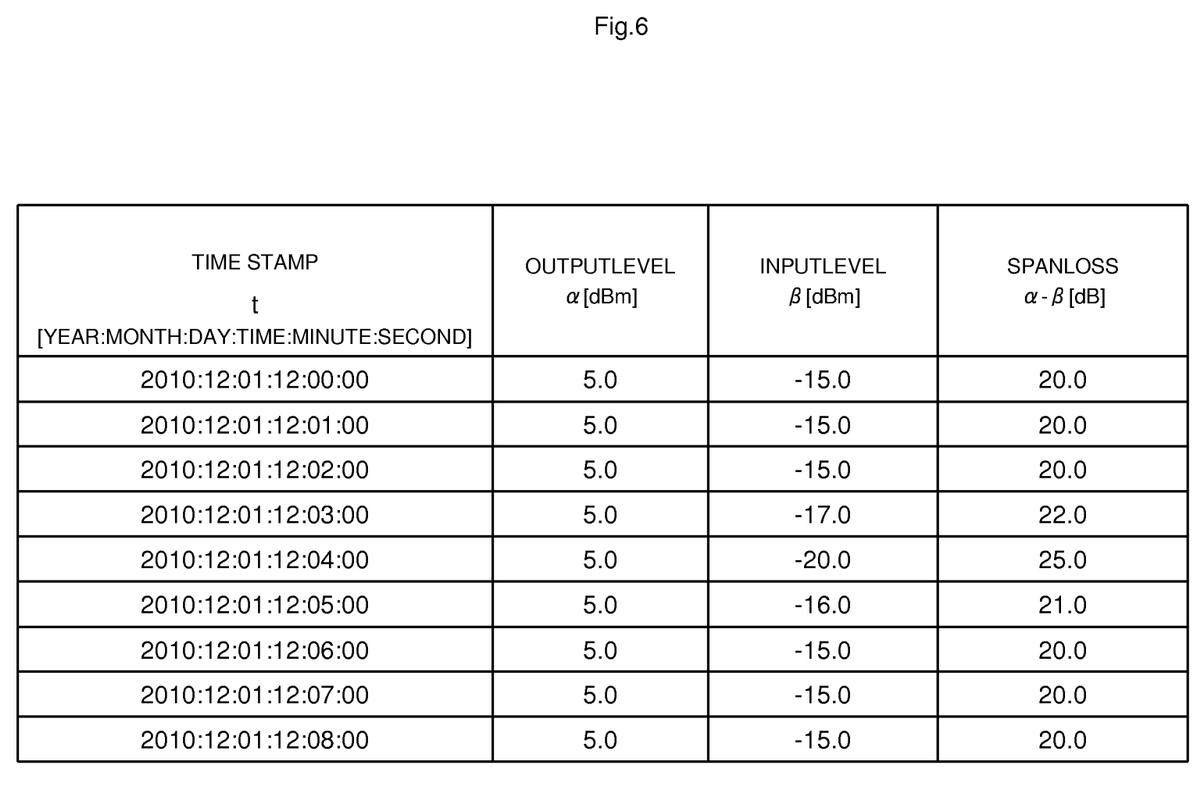
FIG. 6 is a diagram showing an example of a span loss calculation result.

Span loss calculation section 2-2 adds, to the value of an input level monitored by input level monitoring section 2-1 (monitoring period t [sec]), information about the date and time of the monitoring (time stamp information) and holds it. Span loss calculation section 2-2 also holds the time-stamp-information-attached output level value of the upstream station inputted from supervisory signal termination section 2-3. Span loss calculation section 2-2 arranges these level values according to the hours on the basis of the time stamp information as shown in FIG. 6 (an example of t=60 sec), calculates span loss at each hour and holds the span loss for a predetermined period of time. When the output level of upstream-station WDM apparatus 1 is denoted by α [dBm] and the input level of downstream-station WDM apparatus 2 is denoted by β [dBm], span loss is calculated by (α−β) [dB].

Monitoring apparatus 3 arranged at the downstream station can read out a table as shown in FIG. 6, which is held in span loss calculation section 2-2, and a maintainer can confirm span loss appropriately.

By superposing the output level value of the upstream station on a supervisory signal to be transferred from the upstream station to the downstream station, it is possible to calculate span loss at the downstream station and omit the work of confirming the output level of the upstream station.

The output level value transferred from the upstream station is attached with information about the hour when the value was monitored (time stamp information). Thereby, it is possible to perform a comparison between input and output levels at the same hour when span loss is calculated at the downstream station. As a result, span loss is measured as a more accurate value.

Third Exemplary Embodiment

Figure 7:
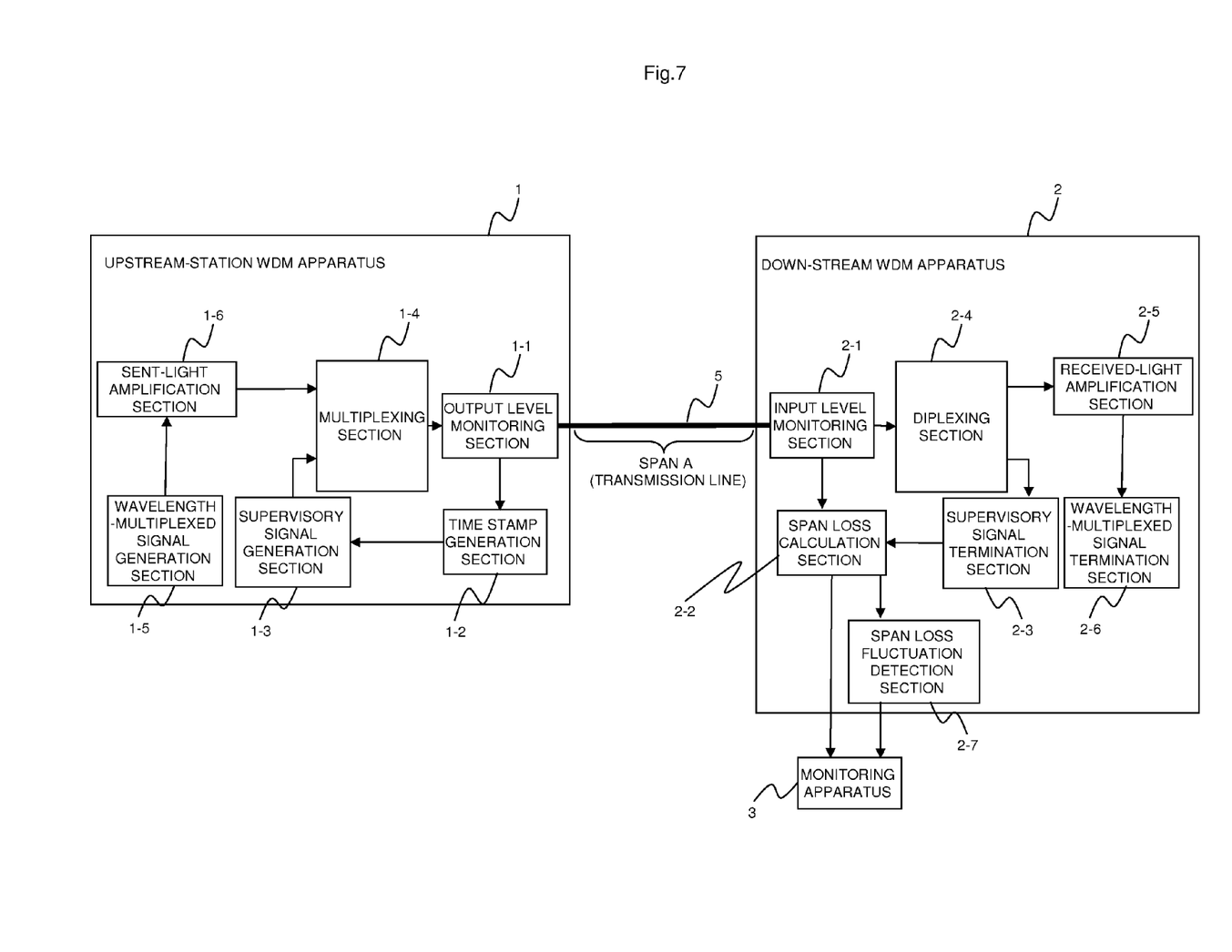
FIG. 7 is a diagram showing a configuration of a span loss monitoring system according to a third exemplary embodiment.

FIG. 7 shows a configuration of a span loss monitoring system according to this exemplary embodiment. The span loss monitoring system according to this exemplary embodiment has a configuration such that span loss fluctuation detection section 2-7 is added between span loss calculation section 2-2 and monitoring apparatus 3 in downstream-station WDM apparatus 2 according to the second exemplary embodiment.

In the span loss monitoring method according to this embodiment, an alarm signal is outputted if the difference between the input level and the output level exceeds a predetermined upper limit threshold or a lower limit threshold, in supervisory signal generation and span loss calculation procedure S200 shown in FIG. 2.

Figure 8:
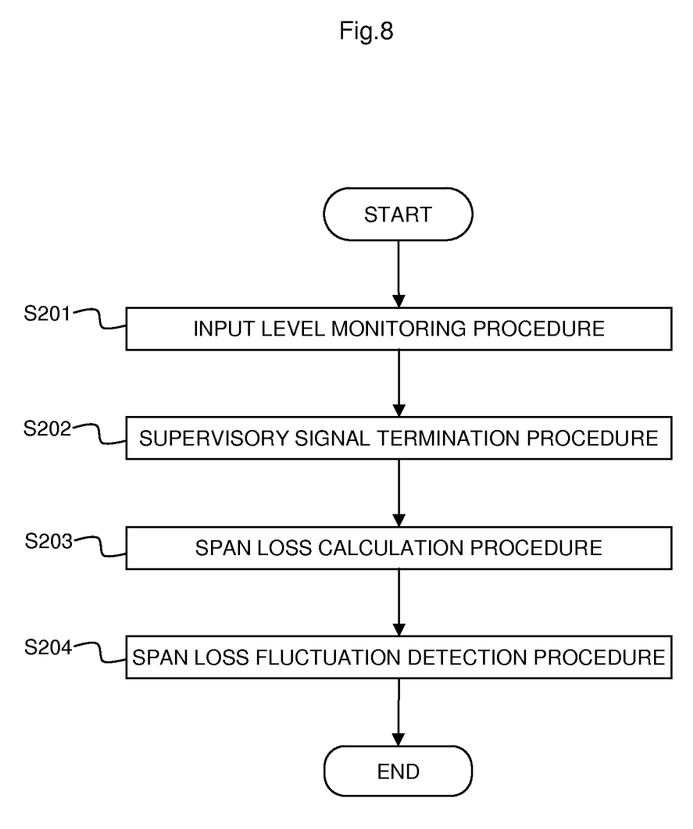
FIG. 8 is a diagram showing an example of a supervisory signal receiving method according to the third exemplary embodiment.

FIG. 8 shows an example of a supervisory signal receiving method according to this exemplary embodiment. The supervisory signal receiving method according to this exemplary embodiment further includes span loss fluctuation detection procedure S204 after span loss calculation procedure S203.

In span loss fluctuation detection procedure S204 shown in FIG. 8, span loss fluctuation detection section 2-7 outputs an alarm signal if the difference calculated by span loss calculation section 2-2 exceeds the upper limit threshold or the lower limit threshold.

For example, span loss fluctuation detection section 2-7 holds a span loss upper limit threshold and lower limit threshold. Span loss fluctuation detection section 2-7 continuously monitors a span loss value inputted from span loss calculation section 2-2, and notifies an alarm to monitoring apparatus 3 as a span loss abnormality if the upper limit threshold or the lower limit threshold is exceeded. If the upper limit threshold and the lower limit threshold are set as 15 dBm and 23 dBm, respectively, an alarm is detected at the date and time of "2010:12:01:12:04:00" when span loss of 25 dBm is calculated, in the case of FIG. 6.

As described above, by being provided with span loss fluctuation detection section 2-7, downstream-station WDM apparatus 2 as the span loss monitoring system and the supervisory signal receiving apparatus, according to this exemplary embodiment, can continuously monitor span loss abnormalities.

Further Exemplary Embodiment 1

A span loss monitoring system comprising:
a supervisory signal sending apparatus comprising:
a multiplexing section into which a wavelength-multiplexed signal and a supervisory signal are inputted and that multiplexes the inputted wavelength-multiplexed signal and supervisory signal;
an output level monitoring section that measures and outputs an output level of a multiplexed light from the multiplexing section and outputs the multiplexed light to a transmission line;
a time stamp generation section that detects the hour of the measurement by the output level monitoring section and associates the output level measurement hour and the output level with each other; and
a supervisory signal generation section that generates the supervisory signal including a pair of the output level measurement hour and the output level associated with each other by the time stamp generation section; and
a supervisory signal receiving apparatus comprising:
an input level monitoring section into which the multiplexed light is inputted from the transmission line and that measures an input level of the multiplexed light;
a supervisory signal termination section that receives the supervisory signal included in the multiplexed light; and
a span loss calculation section that detects the hour of the measurement of the input level by the input level monitoring section, stores the input level measurement hour and the input level associating the input level measurement hour and the input level with each other, extracts the output level measurement hour and the output level included in the supervisory signal received by the supervisory signal termination section, and calculates a difference between the input level and the output level at the same hour.

Further Exemplary Embodiment 2

The span loss monitoring system according to Further exemplary embodiment 1, wherein the supervisory signal receiving apparatus further comprises a span loss fluctuation detection section that holds a span loss upper limit threshold or lower limit threshold and outputs an alarm signal if the difference calculated by the span loss calculation section exceeds the upper limit threshold or the lower limit threshold.

Further Exemplary Embodiment 3

The span loss monitoring system according to Further exemplary embodiment 1 or 2, wherein
the output level monitoring section measures the output level in a predetermined cycle;
the input level monitoring section measures the input level in the predetermined cycle; and
the output level monitoring section and the input level monitoring section start measurement at the same timing at the same hour.

Further Exemplary Embodiment 4

The span loss monitoring system according to Further exemplary embodiment 1 or 2, wherein
the output level monitoring section measures the output level at a predetermined hour;
the input level monitoring section measures the input level at the predetermined hour.

Further Exemplary Embodiment 5

A supervisory signal sending apparatus comprising:

a multiplexing section into which a wavelength-multiplexed signal and a supervisory signal are inputted into and that multiplexes the inputted wavelength-multiplexed signal and supervisory signal;

an output level monitoring section that measures and outputs an output level of a multiplexed light from the multiplexing section and outputs the multiplexed light to a transmission line;

a time stamp generation section that detects the hour of the measurement by the output level monitoring section and associates the output level measurement hour and the output level with each other; and a supervisory signal generation section that generates the supervisory signal including a pair of the output level measurement hour and the output level associated with each other by the time stamp generation section.

Further Exemplary Embodiment 6

The supervisory signal sending apparatus according to Further exemplary embodiment 5, wherein, the output level monitoring section measures the output level in a predetermined cycle.

Further Exemplary Embodiment 7

The supervisory signal sending apparatus according to Further exemplary embodiment 5, wherein, the output level monitoring section measures the output level at a predetermined hour.

Further Exemplary Embodiment 8

A supervisory signal receiving apparatus comprising:

an input level monitoring section into which a multiplexed light of a wavelength-multiplexed signal and a supervisory signal is inputted from a transmission line and that measures an input level of the multiplexed light;

a supervisory signal termination section that receives the supervisory signal included in the multiplexed light; and a span loss calculation section that detects the hour of the measurement of the input level by the input level monitoring section, stores the input level measurement hour and the input level associating the input level measurement hour and the input level with each other, extracts the output level measurement hour and the output level included in the supervisory signal received by the supervisory signal termination section, and calculates a difference between the input level and the output level at the same hour.

Further Exemplary Embodiment 9

The supervisory signal receiving apparatus according to Further exemplary embodiment 8, further comprising a span loss fluctuation detection section that holds a span loss upper limit threshold or lower limit threshold and outputs an alarm signal if the difference calculated by the span loss calculation section exceeds the upper limit threshold or the lower limit threshold.

Further Exemplary Embodiment 10

The supervisory signal receiving apparatus according to Further exemplary embodiment 8 or 9, wherein the input level monitoring section measures the input level in a predetermined cycle.

Further Exemplary Embodiment 11

The supervisory signal receiving apparatus according to Further exemplary embodiment 8 or 9, wherein the input level monitoring section measures the input level at a predetermined hour.

Further Exemplary Embodiment 12

A span loss monitoring method comprising:

a monitoring procedure of a supervisory signal sending apparatus for measuring an output level of a multiplexed light in which a wavelength-multiplexed signal and a supervisory signal are multiplexed, detecting the hour of the measurement of the output level and outputting the multiplexed light to a transmission line and a supervisory signal receiving apparatus for measuring an input level of the multiplexed light inputted from the transmission line and detecting the hour of the measurement of the input level; and supervisory signal generation and a span loss calculation procedure of the supervisory signal sending apparatus for generating a supervisory signal including a pair of the output level measurement hour and the output level and generating a multiplexed light by multiplexing the supervisory signal and a wavelength-multiplexed signal, and the supervisory signal receiving apparatus for extracting the output level measurement hour and the output level included in the supervisory signal of the multiplexed light outputted to the transmission line by the monitoring procedure and calculating a difference between the input level and the output level at the same hour.

Further Exemplary Embodiment 13

The span loss monitoring method according to Further exemplary embodiment 12, wherein, in the supervisory signal generation and span loss calculation procedure, an alarm signal is outputted if the difference between the input level and the output level exceeds a predetermined upper limit threshold or lower limit threshold.

Further Exemplary Embodiment 14

The span loss monitoring method according to Further exemplary embodiment 12 or 13, wherein, in the monitoring procedure, the output level and the input level are measured in a predetermined cycle.

Further Exemplary Embodiment 15

The span loss monitoring method according to Further exemplary embodiment 12 or 13, wherein, in the monitoring procedure, the output level and the input level are measured at a predetermined hour.

Further Exemplary Embodiment 16

A supervisory signal sending method comprising:

an output level monitoring procedure of measuring and outputting an output level of a multiplexed light in which a wavelength-multiplexed signal and a supervisory signal are multiplexed and outputting the multiplexed light to a transmission line;

a time stamp generation procedure of detecting the hour of the measurement by the output level monitoring procedure and associating the output level measurement hour and the output level with each other;

a supervisory signal generation procedure of generating the supervisory signal including a pair of the output level measurement hour and the output level associated with each other by the time stamp generation procedure; and a multiplexing procedure of generating a multiplexed light in which a wavelength-multiplexed signal and the supervisory signal generated by the supervisory signal generation procedure are multiplexed.

Further Exemplary Embodiment 17

The supervisory signal sending method according to Further exemplary embodiment 16, wherein, in the output level monitoring procedure, the output level is measured in a predetermined cycle.

Further Exemplary Embodiment 18

The supervisory signal sending method according to Further exemplary embodiment 16, wherein, in the output level monitoring procedure, the output level is measured at a predetermined hour.

Further Exemplary Embodiment 19

A computer readable recording medium in which a supervisory signal sending program is recorded, the supervisory signal sending program causing a computer to execute:

an output level monitoring procedure of an output level monitoring section for measuring and outputting an output level of a multiplexed light in which a wavelength-multiplexed signal and a supervisory signal are multiplexed and outputting the multiplexed light to a transmission line;

a time stamp generation procedure of a time stamp generation section for detecting the hour of the measurement by the output level monitoring procedure and associating the output level measurement hour and the output level with each other;

a supervisory signal generation procedure of a supervisory signal generation section for generating the supervisory signal including a pair of the output level measurement hour and the output level associated with each other by the time stamp generation procedure; and a multiplexing procedure of a multiplexing section for generating a multiplexed light in which a wavelength-multiplexed signal and the supervisory signal generated by the supervisory signal generation procedure are multiplexed.

Further Exemplary Embodiment 20

The recording medium according to Further exemplary embodiment 19, wherein, in the output level monitoring procedure, the output level monitoring section measures the output level in a predetermined cycle.

Further Exemplary Embodiment 21

The recording medium according to Further exemplary embodiment 19, wherein, in the output level monitoring procedure, the output level monitoring section measures the output level at a predetermined hour.

Further Exemplary Embodiment 22

A supervisory signal receiving method comprising:

an input level monitoring procedure of a multiplexed light of a wavelength-multiplexed signal and a supervisory signal being inputted from a transmission line, measuring an input level of the multiplexed light and detecting the hour of the measurement of the input level;

a supervisory signal termination procedure of receiving the supervisory signal included in the multiplexed light; and a span loss calculation procedure of storing the input level measurement hour and the input level in the input level monitoring procedure associating the input level measurement hour and the input level with each other, extracting a pair of the output level measurement hour and the output level included in the supervisory signal received by the supervisory signal termination procedure, and calculating a difference between the input level and the output level at the same hour.

Further Exemplary Embodiment 23

The supervisory signal receiving method according to Further exemplary embodiment 22, further comprising a span loss fluctuation detection procedure of, while a span loss upper limit threshold or lower limit threshold is held, outputting an alarm signal if the difference calculated in the span loss calculation procedure exceeds the upper limit threshold or the lower limit threshold, after the span loss calculation procedure.

Further Exemplary Embodiment 24

The supervisory signal receiving method according to Further exemplary embodiment 22 or 23, wherein, in the input level monitoring procedure, the input level is measured in a predetermined cycle.

Further Exemplary Embodiment 25

The supervisory signal receiving method according to Further exemplary embodiment 22 or 23, wherein, in the input level monitoring procedure, the input level is measured at a predetermined hour.

Further Exemplary Embodiment 26

A computer readable recording medium in which a supervisory signal receiving program is recorded, the supervisory signal receiving program causing a computer to execute:

an input level monitoring procedure of an input level monitoring section for measuring an input level of a multiplexed light of a wavelength-multiplexed signal and a supervisory signal inputted from a transmission line and detecting the hour of the measurement of the input level;

a supervisory signal termination procedure of a supervisory signal termination section for receiving the supervisory signal included in the multiplexed light; and a span loss calculation procedure of a span loss calculation section for storing the input level measurement hour and the input level in the input level monitoring procedure associating the input level measurement hour and the input level with each other, extracting a pair of the output level measurement hour and the output level included in the supervisory signal received by the supervisory signal termination procedure, and calculating a difference between the input level and the output level at the same hour.

Further Exemplary Embodiment 27

The recording medium according to Further exemplary embodiment 26, the supervisory signal receiving program further comprising a span loss fluctuation detection procedure of, while a span loss upper limit threshold or lower limit threshold is held, a span loss fluctuation detection section outputting an alarm signal if the difference calculated by the span loss calculation section exceeds the upper limit threshold or the lower limit threshold, after the span loss calculation procedure.

Further Exemplary Embodiment 28

The recording medium according to Further exemplary embodiment 26 or 27, wherein, in the input level monitoring procedure, the input level monitoring section measures the input level in a predetermined cycle.

Further Exemplary Embodiment 29

The recording medium according to Further exemplary embodiment 26 or 27, wherein, in the input level monitoring procedure, the input level monitoring section measures the input level at a predetermined hour.

The present invention is applicable to the information communication industry.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A span loss monitoring system comprising:
   a supervisory signal sending apparatus comprising:
   a multiplexing section into which a wavelength-multiplexed signal and a supervisory signal are inputted and that multiplexes the inputted wavelength-multiplexed signal and supervisory signal;
   an output level monitoring section that measures and outputs an output level of a multiplexed light from the multiplexing section and outputs the multiplexed light to a transmission line;
   a time stamp generation section that detects the hour of the measurement by the output level monitoring section and associates the output level measurement hour and the output level with each other; and
   a supervisory signal generation section that generates the supervisory signal including a pair of the output level measurement hour and the output level associated with each other by the time stamp generation section; and
   a supervisory signal receiving apparatus comprising:
   an input level monitoring section into which the multiplexed light is inputted from the transmission line and that measures an input level of the multiplexed light;
   a supervisory signal termination section that receives the supervisory signal included in the multiplexed light; and
   a span loss calculation section that detects the hour of the measurement of the input level by the input level monitoring section, stores the input level measurement hour and the input level associating the input level measurement hour and the input level with each other, extracts the output level measurement hour and the output level included in the supervisory signal received by the supervisory signal termination section, and calculates a difference between the input level and the output level at the same hour.

2. The span loss monitoring system according to claim 1, wherein the supervisory signal receiving apparatus further comprises a span loss fluctuation detection section that holds a span loss upper limit threshold or lower limit threshold and outputs an alarm signal if the difference calculated by the span loss calculation section exceeds the upper limit threshold or the lower limit threshold.

3. The span loss monitoring system according to claim 1, wherein
   the output level monitoring section measures the output level in a predetermined cycle;
   the input level monitoring section measures the input level in the predetermined cycle; and
   the output level monitoring section and the input level monitoring section start measurement at the same timing at the same hour.

4. The span loss monitoring system according to claim 1, wherein
   the output level monitoring section measures the output level at a predetermined hour;
   the input level monitoring section measures the input level at the predetermined hour.

5. A supervisory signal sending apparatus comprising:
   a multiplexing section into which a wavelength-multiplexed signal and a supervisory signal are inputted into and that multiplexes the inputted wavelength-multiplexed signal and supervisory signal;
   an output level monitoring section that measures and outputs an output level of a multiplexed light from the multiplexing section and outputs the multiplexed light to a transmission line;
   a time stamp generation section that detects the hour of the measurement by the output level monitoring section and associates the output level measurement hour and the output level with each other; and
   a supervisory signal generation section that generates the supervisory signal including a pair of the output level measurement hour and the output level associated with each other by the time stamp generation section.

6. The supervisory signal sending apparatus according to claim 5, wherein, the output level monitoring section measures the output level in a predetermined cycle.

7. The supervisory signal sending apparatus according to claim 5, wherein, the output level monitoring section measures the output level at a predetermined hour.

8. A supervisory signal receiving apparatus comprising:
   an input level monitoring section into which a multiplexed light of a wavelength-multiplexed signal and a supervisory signal is inputted from a transmission line and that measures an input level of the multiplexed light;
   a supervisory signal termination section that receives the supervisory signal included in the multiplexed light; and
   a span loss calculation section that detects the hour of the measurement of the input level by the input level monitoring section, stores the input level measurement hour and the input level associating the input level measurement hour and the input level with each other, extracts the output level measurement hour and the output level included in the supervisory signal received by the supervisory signal termination section, and calculates a difference between the input level and the output level at the same hour.

9. The supervisory signal receiving apparatus according to claim 8, further comprising a span loss fluctuation detection section that holds a span loss upper limit threshold or lower limit threshold and outputs an alarm signal if the difference calculated by the span loss calculation section exceeds the upper limit threshold or the lower limit threshold.

10. The supervisory signal receiving apparatus according to claim 8, wherein the input level monitoring section measures the input level in a predetermined cycle.

11. The supervisory signal receiving apparatus according to claim 8, wherein the input level monitoring section measures the input level at a predetermined hour.

* * * * *